July 27, 1926.
G. G. ROSINO
1,593,778
HEADLIGHT DIMMING ATTACHMENT
Filed March 7, 1925
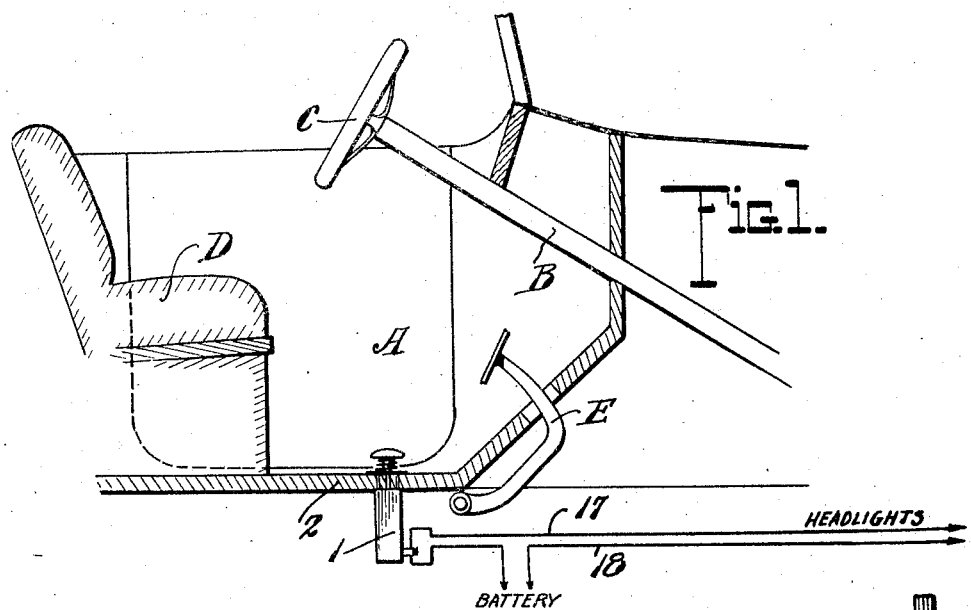
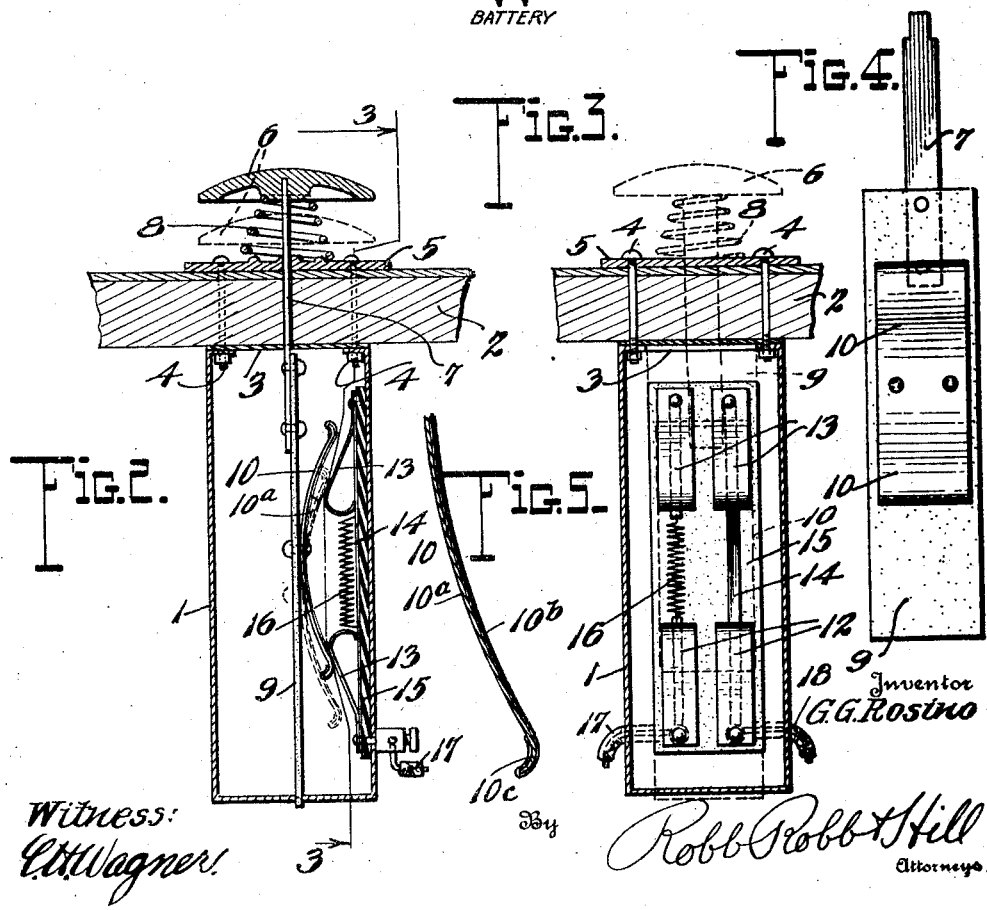
Witness:
C. H. Wagner
Inventor
G. G. Rosino
By
Robb, Robb & Hill
Attorneys.

Patented July 27, 1926.

1,593,778

UNITED STATES PATENT OFFICE.

GILBERT G. ROSINO, OF SANDUSKY, OHIO.

HEADLIGHT-DIMMING ATTACHMENT.

Application filed March 7, 1925. Serial No. 13,930.

The purpose of this invention has been to devise a simple and handy light dimming contrivance for automobiles, one which may be operated by the foot of the driver of the car, and which by reason of its simplicity of construction and attachability, may be readily applied to an automobile already in use.

In its preferred embodiment my invention comprises a footboard attachment constituting practically a unit which may be readily secured to the base or footboard of the car adjacent to either the brake or clutch pedals, the device including a foot piece depressible to operate an electric contact member movable from a normal position wherein it enables the full current supplied to the electrical headlights to be used, to another position wherein a resistance is caused to be interposed in the circuit including said headlights, to thus cause a dimming of the action of the latter in the well known manner.

Reference is had to the following description for a full understanding of the invention, to be considered in conjunction with the accompanying drawings in which—

Figure 1 is a somewhat diagrammatic sectional view of the front portion of an automobile illustrating one of the foot pedals, the dimming attachment of my invention, and showing also in a diagrammatic way the electric circuit for the head lights;

Figure 2 is a vertical sectional view of my dimming attachment alone;

Figure 3 is a sectional view taken about on the line 3—3 of Figure 2, the foot piece shown in dotted lines to illustrate its relation to the other elements depicted;

Figure 4 is a view of the depressible contact member actuated by the foot piece; and Figure 5 is a fragmentary sectional view of the lower portion of said contact member.

Referring to the drawings illustrating a simple and preferred embodiment of the invention, A denotes the portion of the motor vehicle shown to embody the customary construction involving the steering post B, steering wheel C, seat D and pedal E. The pedal E may be the clutch or brake pedal of the car but my light dimming attachment is preferably placed adjacent to the clutch pedal so that the foot of the operator employed for managing said pedal may be used to operate the light dimmer of the invention, when not functioning for the depression of the said clutch pedal.

The light dimming attachment will be observed as comprising a casing 1 suitably secured to the bottom of the base or footboard 2 of the car and preferably including a top plate 3 through which securing bolts 4 pass, the latter also passing through the board 2 and through a finishing plate 5 above the board 2 and below the depressible foot piece 6. The foot piece 6 may be of any suitable form, ornamental or otherwise, and has secured thereto and projecting downwardly therefrom a stem 7 which passes through a slot that may readily be formed in the board 2, a spring 8 being interposed between the plate 5 and the foot piece 6 for holding the latter normally in an elevated position, or at the upper limit of its normal range of movement.

The spring 8 encircles the stem 7 and on the lower end of the stem 7, within the casing 1, is mounted the contact device controlling the light dimming action of the invention. This contact device preferably comprises a supporting member 9 of insulation substance and a contact member 10 of metal. This contact member 10 may be composed of a body piece of copper or other metal especially useful for contact purposes but I have illustrated the contact member as being composed of a light piece of sheet steel 10$^a$ carrying on its face a contacting element 10$^b$ preferably of copper, the latter having its upper and lower ends folded as at 10$^c$ to engage firmly with the upper and lower extremities of the part 10$^a$. It is to be understood that this construction is not material, however, because while it provides an excellent formation of the contact member, the latter may be otherwise constructed so long as it provides a satisfactory closing connection for circuit terminal members included in the circuit in which the headlights of the machine are located.

The contact member 10 is relatively wide and somewhat elongated and is normally adapted, when the foot piece 6 is upraised to span the space between and connect the lower spring contact terminals 12 attached to a base 15 of insulation applied to a side of the casing 1 on the interior of the latter. This normal cooperation of the contact member 10 with the parts 12 is illustrated in full lines in Figure 2 and in dotted lines the contact member 10 is shown as being lowered by depression of the foot piece 6. In its lowered position the contact member 10 spans the space between and connects a pair of upper spring terminal members 13. The terminal member 13 is connected with the terminal member 12 beneath it by means of suitable electric current conducting substance such as a copper strip 14, and the other terminal member 13 is connected with the terminal 12 beneath it by means of electric resistance wire designated 16.

In view of the construction and arrangement of the terminals 12 and 13 and the connections between them including the parts 14 and 16, it will be evident that when the parts are in the position of the full lines of Figure 2 the circuit including the wires 17 and 18 leading to the headlights, not shown, and connected with the terminal plates 12 as illustrated in Figure 1, will be so connected by the cooperation of the contact member 10 with the two plates 12, that the full current of the battery will be delivered to the headlights.

The above action is secured as an incident to the normal position of the pedal 6 held upraised by the spring 8. By simply depressing the pedal 6 the contact member 10 at its lower end is moved to a position in which it is spaced from the terminal members 12, and its upper end is caused to move into contact with the upper terminal contact members 13, whereupon the current of the circuit including the wires 17 and 18 will pass from one terminal member 12 through the resistance wire 16 to the terminal member 13 just above, thence across the contact member 10 to the adjacent terminal member 13, and from said adjacent terminal member 13 down through the conductive connection 14 to the terminal 12 and to the wire 17.

By reason of the compactness of my device it may be manufactured and sold as a complete attachment and may be very readily applied to cars when put out from the factory, and to those which have gone into use already, hundreds of thousands of which are in operation and not equipped today with any means for the convenient dimming of the headlights thereof. I have had in view, furthermore, in the design of my invention an utmost simplicity of structure rendering it very cheap to manufacture.

Having thus described my invention, what I claim as new and desire to secure by Letters Patent is:

1. A light dimming attachment for automobiles comprising a unit adapted to be secured to the car and including a casing, fastenings for attaching the casing at one end to the car, the casing having a guide opening at its lower end, a contact supporting part mounted in the casing for longitudinal movement and having its lower end movable through the opening aforesaid so as to be guided thereby, a stem connected with said supporting part and projecting beyond the other end of the casing, a manually depressible operating member attached to the said stem so as to actuate the contact supporting part, a contact assembly unit, including an insulating plate secured to said casing and a plurality of contacts mounted thereon, and a single contact member carried by said supporting part and normally connecting with certain of said plate contacts in one position, said member being depressible to effect cooperation with certain other of the plate contacts.

2. A light dimming attachment for automobiles comprising a unit including a casing, an insulation base applied to the inside of a wall of said casing, pairs of terminal contact members on said insulation base, each pair comprising members spaced apart, a strip of conductive material connecting one terminal member of one of said pairs with a terminal member of the other of said pairs, a resistance wire connecting the other terminal member of said first pair to the other terminal member of the second pair, a contact member in the casing movable to connect the contact terminal members of either pair, and actuating means for said contact member.

3. A light dimming attachment for automobiles comprising a unit including a casing, an insulation base applied to the inside of a wall of said casing, pairs of terminal contact members on said insulation base, each pair comprising members spaced apart, a strip of conductive material connecting one terminal member of one of said pairs with a terminal member of the other of said pairs, a resistance wire connecting the other terminal member of said first pair to the other terminal member of the second pair, a contact member in the casing movable to connect the contact terminal members to either pair, and actuating means for said contact member comprising a supporting part reciprocable in the casing, an actuating stem projecting from said part, and a depressible manually operable member attached to said stem.

4. A light dimming attachment for automobiles comprising a unit including a casing, an insulation base applied to the inside of a wall of said casing, pairs of terminal contact members on said insulation base, each pair comprising members spaced apart, a strip of conductive material connecting one terminal member of one of said pairs with a terminal member of the other of said pairs, a resistance wire connecting the other terminal member of said first pair to the other terminal member of the second pair, a contact member in the casing movable to connect the contact terminal members to either pair, actuating means for said contact member comprising a supporting part reciprocable in the casing, an actuating stem projecting from said part, and a depressible manually operable member attached to said stem, attaching means secured to an end of the casing to pass through a baseboard part of an automobile, and a finishing plate cooperating with said attaching means and with the said spring and between which and the manually depressible member the said spring is disposed.

In testimony whereof I affix my signature.

GILBERT G. ROSINO.